(12) United States Patent
Lee et al.

(10) Patent No.: US 11,242,915 B1
(45) Date of Patent: Feb. 8, 2022

(54) SELECTABLE ONE-WAY CLUTCH IN TWO SPEED DRIVE UNIT OF ELECTRICAL VEHICLE

(71) Applicant: GM Global Technology Operations LLC, Detroit, MI (US)

(72) Inventors: Chunhao J Lee, Troy, MI (US); Farzad Samie, Franklin, MI (US); Chi-Kuan Kao, Troy, MI (US); Norman K Bucknor, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/004,801

(22) Filed: Aug. 27, 2020

(51) Int. Cl.
*F16H 3/44* (2006.01)
*F16D 41/04* (2006.01)
*B60K 17/08* (2006.01)
*F16D 47/04* (2006.01)
*F16D 28/00* (2006.01)
*B60K 1/00* (2006.01)
*B60L 7/10* (2006.01)

(52) U.S. Cl.
CPC .............. *F16H 3/44* (2013.01); *B60K 1/00* (2013.01); *B60K 17/08* (2013.01); *B60L 7/10* (2013.01); *F16D 28/00* (2013.01); *F16D 41/04* (2013.01); *F16D 47/04* (2013.01); *F16H 2200/0021* (2013.01); *F16H 2200/0034* (2013.01); *F16H 2200/0082* (2013.01); *F16H 2200/2005* (2013.01); *F16H 2200/2033* (2013.01); *F16H 2200/2082* (2013.01)

(58) Field of Classification Search
CPC ........................ F16H 2200/2005–2028; F16H 2200/2033–2094; F16H 3/44–728; F16D 41/00–36; B60K 1/00–02; B60K 17/00–36; B60L 7/10
See application file for complete search history.

(56) References Cited

U.S. PATENT DOCUMENTS

| | | | |
|---|---|---|---|
| 5,285,111 A * | 2/1994 | Sherman | F16H 37/0826 |
| | | | 290/4 C |
| 8,029,403 B2 | 10/2011 | Lee et al. | |
| 8,296,020 B2 | 10/2012 | Lee et al. | |
| 8,371,982 B2 | 2/2013 | Lee et al. | |
| 8,454,466 B2 * | 6/2013 | Samie | B60K 6/383 |
| | | | 475/8 |

(Continued)

FOREIGN PATENT DOCUMENTS

DE 102018004500 A1 1/2019
DE 102018208583 A1 12/2019
(Continued)

*Primary Examiner* — Ernesto A Suarez
*Assistant Examiner* — Lillian T Nguyen
(74) *Attorney, Agent, or Firm* — Vivacqua Crane PLLC

(57) ABSTRACT

A two-speed drive unit of an electric vehicle includes a planetary gear set transmission having multiple elements including a first element, a second element and a third element. A motor generator unit supplies a motive force to the planetary gear set transmission. A first stage gear transfers the motive force to the planetary gear set transmission from the motor generator unit. A second stage gear is connected through the second element to a final drive. A first torque transmitting device defining a selectable one-way clutch (SOWC) is connected to the third element.

14 Claims, 4 Drawing Sheets

(56) References Cited

U.S. PATENT DOCUMENTS

| | | | |
|---|---|---|---|
| 8,494,738 | B2 | 7/2013 | Lee et al. |
| 8,655,525 | B2 | 2/2014 | Samie et al. |
| 9,327,598 | B1 | 5/2016 | Lee et al. |
| 9,855,830 | B2 * | 1/2018 | Knoblauch ............... B60K 1/00 |
| 2012/0203403 | A1 * | 8/2012 | Lee ........................ B60K 6/445 |
| | | | 701/22 |
| 2012/0295756 | A1 * | 11/2012 | Lee ........................... F16H 3/66 |
| | | | 475/289 |
| 2016/0375754 | A1 * | 12/2016 | Kurosaki ............... B60K 6/445 |
| | | | 475/5 |
| 2017/0050636 | A1 * | 2/2017 | Shibata .................. B60K 6/383 |
| 2018/0208040 | A1 * | 7/2018 | Singh ..................... B60K 6/365 |

FOREIGN PATENT DOCUMENTS

| | | |
|---|---|---|
| DE | 102018128780 A1 | 5/2020 |
| DE | 102019114139 B3 | 6/2020 |

\* cited by examiner

SELECTABLE ONE-WAY CLUTCH IN TWO SPEED DRIVE UNIT OF ELECTRICAL VEHICLE

INTRODUCTION

The present disclosure relates to automobile drive units used in electrical vehicles.

Many known electrical vehicles utilize a single speed drive system, where an electric motor directly drives one or more vehicle wheels. A single speed drive system may have limitations in operating efficiency at different vehicle speeds, which may be improved by the addition of a two speed or more shifting capability. The ability to provide a smooth shift quality between drive speeds while also providing for the ability to recapture energy using regenerative braking has led some electrical vehicle designs having a two or more speed transmission to elect a two clutch system, for example a claw/dog clutch with a free-wheeling member in combination with a known friction clutch.

Known electrical vehicle two clutch systems are not selectable in that they always automatically brake one direction of rotation of the transmission component, and free-wheel in an opposite direction of rotation of the transmission component. Drag created due to friction generated in the friction clutch even during the free-wheeling condition introduces inefficiency in the drive system.

Thus, while current electrical vehicle single and multiple speed drive systems achieve their intended purpose, there is a need for a new and improved system and method for operating a two-speed drive system for an electrical vehicle.

SUMMARY

According to several aspects, a two-speed drive unit of an electric vehicle includes a planetary gear set transmission having multiple elements including a first element, a second element and a third element. A motor generator unit supplies a motive force to the planetary gear set transmission. A first stage gear transfers the motive force to the planetary gear set transmission through the motor generator unit providing a first fixed gear ratio. A second stage gear provides a second fixed gear ratio connected through the second element to a final drive. The first and the second fixed gear ratios are used to increase an overall gear ratio for a first speed gear ratio and a second speed gear ratio. A first torque transmitting device defining a selectable one-way clutch (SOWC) is connected to the third element.

In another aspect of the present disclosure, the first element defines a ring gear member, the second element defines a carrier member and the third element defines a sun gear member.

In another aspect of the present disclosure, the first element defines a carrier member, the second element defines a ring gear member and the third element defines a sun gear member.

In another aspect of the present disclosure, the first element defines a sun gear member, the second element defines a carrier member and the third element defines a ring gear member.

In another aspect of the present disclosure, a second torque transmitting device is provided between the first element and the second element selectively frictionally engaged to couple the first element to the second element.

In another aspect of the present disclosure, the second torque transmitting device defines a friction clutch.

In another aspect of the present disclosure, the SOWC is electrically actuated.

In another aspect of the present disclosure, a controller signals operation of multiple locking and unlocking members of the SOWC.

In another aspect of the present disclosure, the SOWC is electrically driven to change positions of multiple locking members and multiple unlocking members from unlocked (free) positions to locked positions having the locking members and the unlocking members extending from a first plate of the SOWC to a engage a second plate of the SOWC, designated as lock-lock positions of the locking members and the unlocking members.

In another aspect of the present disclosure, the SOWC is grounded at the third element.

According to several aspects, a two-speed drive unit of an electric vehicle includes a planetary gear set transmission having multiple elements including a first element, a second element a third element, and a first stage gear and a second stage gear. A motor generator unit supplies a motive force to the first stage gear. The first stage gear transfers the motive force to the planetary gear set transmission from the motor generator unit. The second stage gear is connected through the second element to a final drive. A first torque transmitting device defining a selectable one-way clutch (SOWC) is connected to the third element. A second torque transmitting device provided between the first element and the second element are selectively frictionally engaged to couple the first element to the second element. A controller signals operation of multiple locking and unlocking members of the SOWC.

In another aspect of the present disclosure, the SOWC provides for a reverse drive in a low gear (LL lock-lock) and a forward drive in a low gear using a free-wheeling (FW) function.

In another aspect of the present disclosure, the SOWC provides a first power drive defining a low to high gear free-wheel FW shift with the second torque transmitting device engaged.

In another aspect of the present disclosure, the SOWC provides for a second power drive defining a high to gear freewheeler shift with the second torque transmitting device disengaged.

In another aspect of the present disclosure, a controller includes a processor and a non-transitory memory in communication with the processor, the non-transitory memory storing instructions to be executed by the processor. The controller performs calculations and generates signals to the SOWC to transition into and out of electrical vehicle (EV) mode defining a motor mode.

In another aspect of the present disclosure, the signals generated by the controller are applied during an EV mode shift operation.

In another aspect of the present disclosure, the SOWC includes multiple engaging elements. The SOWC is electrically driven to change position of the multiple engaging elements from unlocked (free) to locked positions, designated as lock-lock positions of the engaging elements.

According to several aspects, a method for operating a two-speed drive unit of an electric vehicle includes: attaching multiple elements to a planetary gear set transmission including a first element, a second element and a third element; supplying a motive force to the planetary gear set transmission from a motor generator unit; connecting a first torque transmitting device defining a selectable one-way clutch (SOWC) to the third element; connecting a second torque transmitting device to the planetary gear set transmission between the first element and the second element; providing a first drive speed range by supplying the motive force to the planetary gear set transmission from the motor generator unit to a first stage gear with the SOWC engaged and the second torque transmitting device disengaged through the second element to a final drive; and creating a second drive speed range by supplying the motive force to the planetary gear set transmission from the motor generator unit to the first stage gear, with the SOWC disengaged and the second torque transmitting device engaged through the second element to the final drive.

In another aspect of the present disclosure, the method further includes when a low to high gear shift is elected during a regeneration mode, a transmission shift is provided by initially unloading the motor generator unit from a lock-lock function to a free wheel function, then engaging the second torque transmitting device.

In another aspect of the present disclosure, the method further includes when a high to low gear shift is elected during a regeneration mode, the second torque transmitting device is initially disengaged followed by speeding up and matching a speed of the motor generator unit from a free wheel condition to a lock-lock condition.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
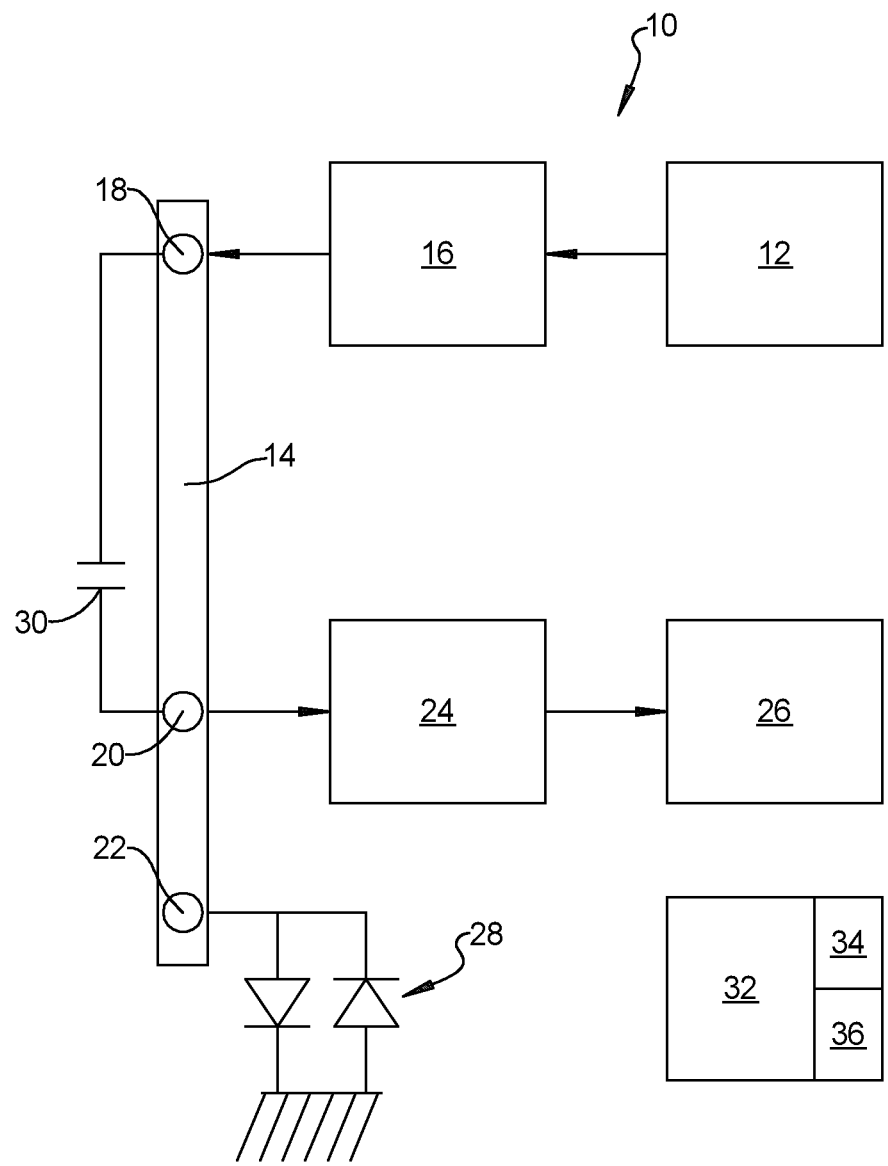
FIG. 1 is a diagram of a system for a two-speed drive unit of an electric vehicle having a selectable one-way clutch according to an exemplary aspect.

Referring to FIG. 1, a lever diagram defines components of a system for a two-speed drive unit of an electric vehicle having a selectable one-way clutch 10. A motor generator unit 12 supplies motive force to a planetary gear set transmission 14 through a first stage gear 16. The planetary gear set transmission 14 includes multiple elements including a first element 18, a second element 20 and a third element 22. According to a first aspect, the first element 18 may be a ring gear member, the second element 20 may be a carrier member and the third element 22 may be a sun gear member. According to a second aspect, the first element 18 may be a carrier member, the second element 20 may be a ring gear member and the third element 22 may be a sun gear member. According to a third aspect, the first element 18 may be a sun gear member, the second element 20 may be a carrier member and the third element 22 may be a ring gear member.

A second stage gear 24 may also be connected through the second element 20 to a final drive 26 providing for a fixed gear ratio to increase an overall gear ratio. To connect the first stage gear 16 or the second stage gear 24 a first torque transmitting device defining a selectable one-way clutch (SOWC) 28 is provided which is grounded at the third element 22. According to several aspects the SOWC 28 may be electrically actuated or may be hydraulically actuated for example using a mechanical oil pump as known. To provide the second drive speed range a second torque transmitting device defining a friction-type clutch 30 is provided between the first element 18 and the second element 20 which is selectively frictionally engaged to couple the first element 18 to the second element 20. According to further aspects, the planetary gear set transmission 14 may also be a double pinion, a Ravigneaux member or a single lever design. The two-speed planetary gear set transmission 14 can have the first speed ratio be a 2:1 ratio or a 1.6:1 ratio and the $2^{nd}$ speed ratio can be a 1:1 ratio depending on the design of the teeth number of the ring and sun gear teeth. The first and second stage gears can be designed to change the overall transmission ratio. For example, the first stage gear may have a gear ratio of 3:1 and the $2^{nd}$ stage gear may have a gear ratio of 4:1 so that the overall transmission ratio can be 3*(2 or 1.6)*4 for the first speed and can be 3*1*4 for the $2^{nd}$ speed.

Operational control of the components of the system including selection for locking or unlocking members of the SOWC 28 for the two-speed drive unit of the electric vehicle having a selectable one-way clutch 10 is provided via a controller 32. The controller 32 may include a processor 34 and a non-transitory memory 36 in communication with the processor 34. The non-transitory memory 36 can store instructions that can be executed by the processor 34 as is known. The controller 32 performs calculations and generates signals to the SOWC 28 to transition into and out of electrical vehicle (EV) mode, defining a motor mode. The signals generated by the controller 32 may be used during EV shift operations. If a torque converter is provided with the planetary gear set transmission 14 the signals generated by the controller 32 may also be used to provide accurate torque converter conditions in EV shift operations.

According to several aspects, the SOWC 28 can be electrically driven to change position of multiple engaging elements from unlocked (free) to locked positions with the engaging elements extending from a first plate of the SOWC 28 to a engage a second plate of the SOWC 28, designated as lock-lock positions of the engaging elements. The SOWC 28 may also have a default lock-lock condition of the engaging elements. The SOWC 28 may also use a mechanical oil pump for changing positions of the engaging elements.

The SOWC 28 may provide for a reverse drive in a low gear (LL lock-lock). The SOWC 28 may provide for a forward drive in a low gear using a free-wheeling (FW) function (LL→FW). The SOWC 28 may provide for a first power drive defining a low to high gear free-wheel FW shift with the clutch 30 engaged. The SOWC 28 may further provide for a second power drive defining a high gear to gear freewheeler shift with the clutch 30 disengaged.

When a low to high gear shift is elected during a regeneration mode, a transmission shift may be provided by initially unloading the motor generator unit 12 from a lock-lock function to a free wheel function, then engaging the clutch 30. When a high to low gear shift is elected during a regeneration mode, the clutch 30 is initially disengaged followed by speeding up and matching a speed of the motor generator unit 12 from a free wheel condition to a lock-lock condition.

Figure 2:
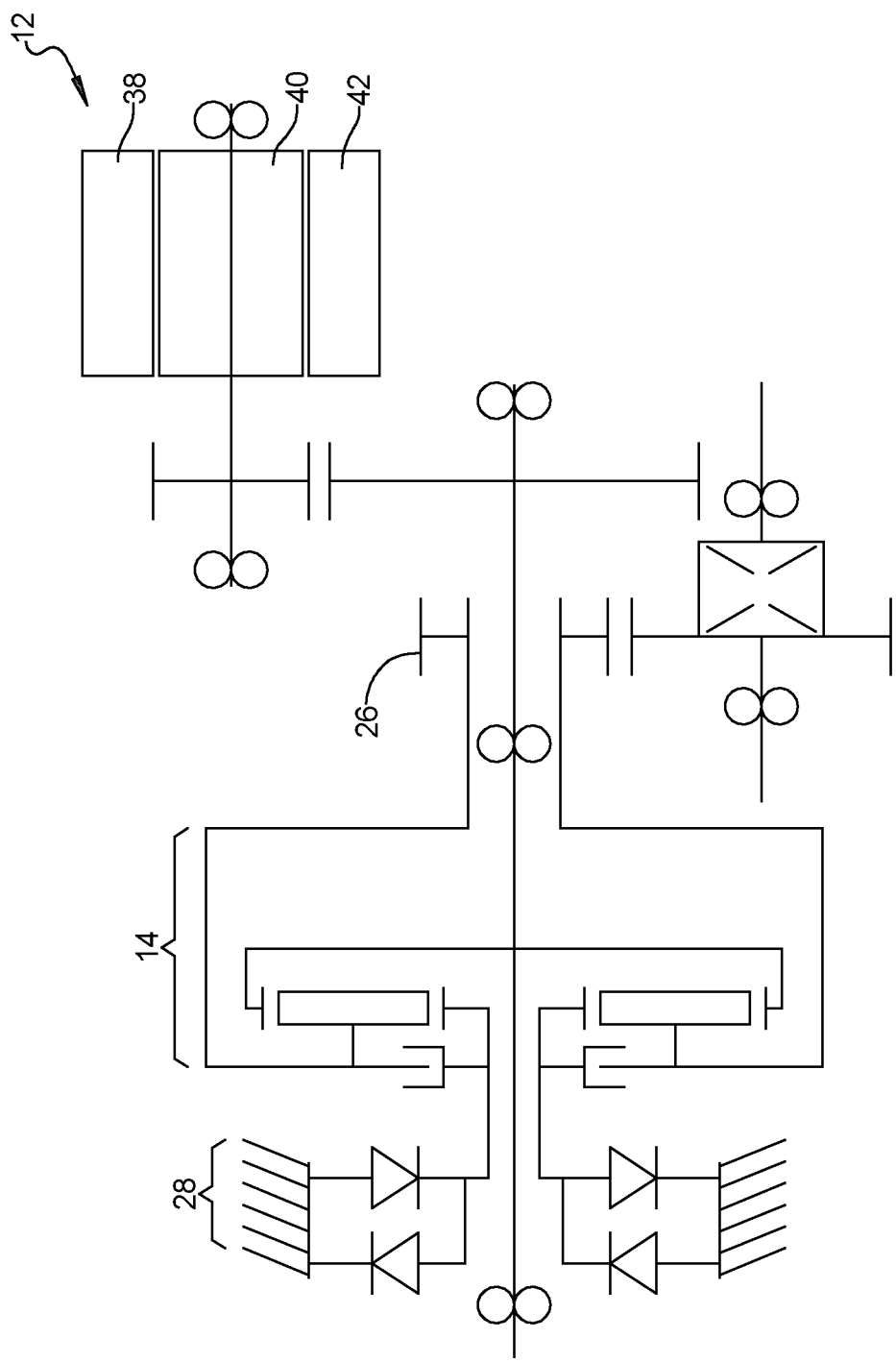
FIG. 2 is a first stick diagram of the system of FIG. 1 according to an aspect of the present disclosure.

Referring to FIG. 2 and again to FIG. 1, a first stick diagram example of the system for a two-speed drive unit of an electric vehicle having a selectable one-way clutch 10 presents exemplary details of the motor generator unit 12. According to several aspects, the motor generator unit 12 may include four slots per phase 38, eight rotor poles 40 and 96 stator slots 42.

Figure 3:
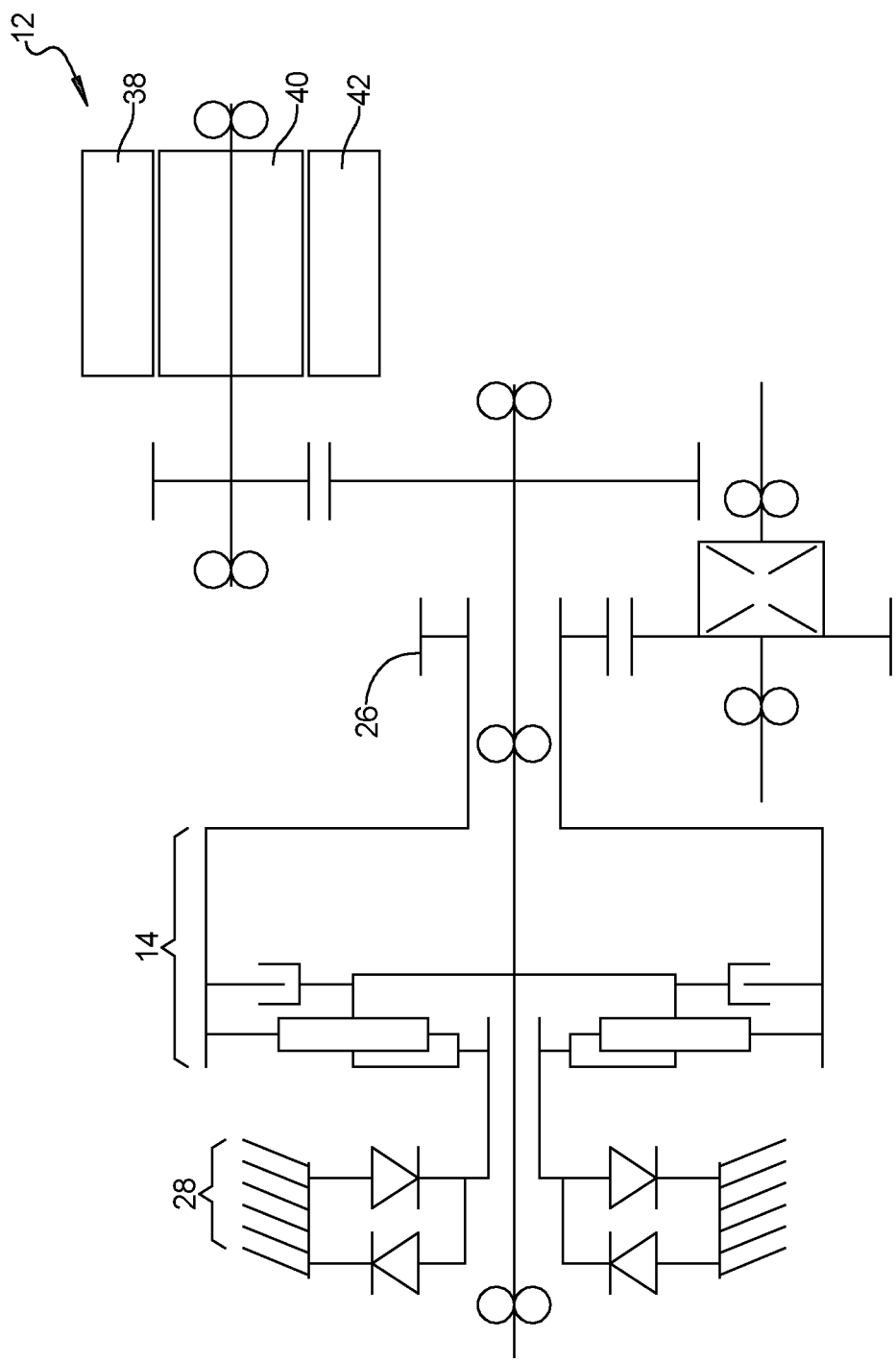
FIG. 3 is a second stick diagram of the system of FIG. 1 according to another aspect of the present disclosure.

Referring to FIG. 3 and again to FIG. 1, a second stick diagram example of the system for a two-speed drive unit of an electric vehicle having a selectable one-way clutch 10 presents exemplary details of the motor generator unit 12.

The stick diagrams present examples with the 2-speed planetary gear set transmission positioned between $1^{st}$ and $2^{nd}$ fixed gear sets. The 2-speed planetary gear set transmission position can also be before or after the two fixed gear sets. The first speed in the 2-speed planetary gear set transmission 14 is achieved when the SOWC 28 is engaged and the second torque transmitting device defining the friction-type clutch 30 is not engaged. The second speed is achieved when the SOWC 28 is not engaged and the second torque transmitting device defining the friction-type clutch 30 is engaged.

Figure 4:
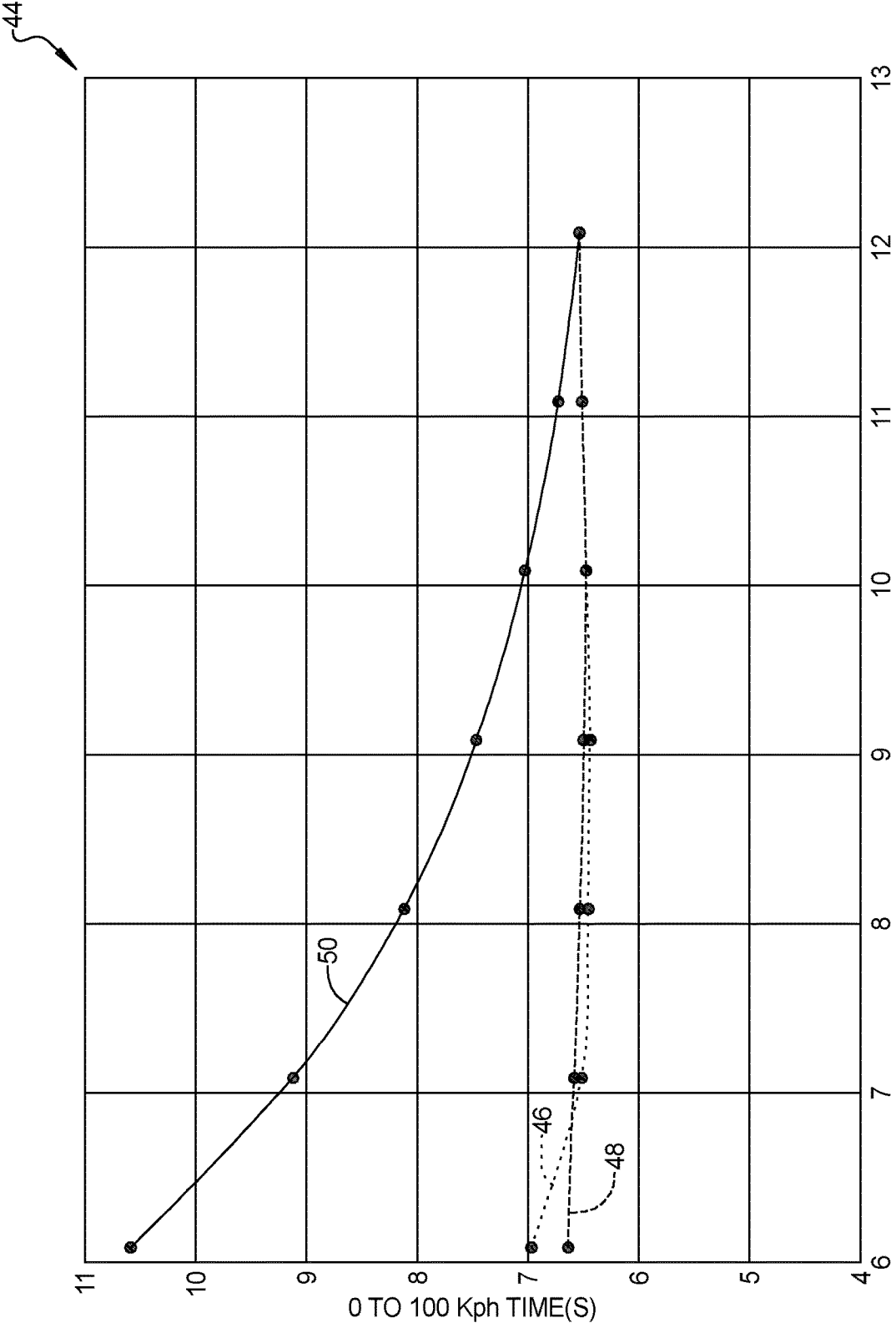
FIG. 4 is a graph comparing two individual drive systems having the system of FIG. 1 compared to a single speed drive system.

Referring to FIG. 4 and again to FIG. 1, a graph 44 presents exemplary zero to one-hundred kilometer-per-hour (kph) vehicle performance data for a first 2-speed transmission 46 of the present disclosure having a first gear ratio of 1.75:1 and a second gear ratio of 1:1. Exemplary 0 to 100 kph vehicle performance data is also provided for a 2-speed transmission 48 of the present disclosure having a first gear ratio of 2.0:1 and a second gear ratio of 1:1. The first 2-speed transmission 46 and the second 2-speed transmission 48 provide improved performance compared to a single speed transmission 50 over an FD ratio range between approximately 6 up to approximately 12. The two fixed gearsets further improve the overall gear ratio because it is not practical to reach the desired overall gear ratio by the planetary gear set or the final drive fixed gear set alone.

A system for a two-speed drive unit of an electric vehicle having a selectable one-way clutch 10 of the present disclosure offers several advantages. These include a 2-speed transmission benefiting from up-speeding the motor generator unit to stay in a higher efficiency zone for regenerative operation. These also include a 2-speed transmission benefiting from an improved shift quality by up-speeding or down-speeding the motor generator unit.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A two-speed drive unit of an electric vehicle, comprising:
    a planetary gear set transmission having multiple elements including a first element, a second element and a third element;
    a motor generator unit supplying a motive force to the planetary gear set transmission;
    a first torque transmitting device defining a selectable one-way clutch (SOWC) connected to the third element;
    a second torque transmitting device provided between the first element and the second element selectively frictionally engaged to couple the first element to the second element;
    a final drive;
    a first stage gear transferring the motive force to the planetary gear set transmission through the motor generator unit providing a first fixed gear ratio; and
    a second stage gear providing a second fixed gear ratio connected through the second element to the final drive, the first and the second fixed gear ratios increasing an overall gear ratio for a first speed gear ratio and a second speed gear ratio;
    wherein the first speed gear ratio is supplied by the motive force to the planetary gear set transmission from the motor generator unit to a first stage gear with the SOWC engaged and the second torque transmitting device disengaged through the second element to the final drive,
    wherein the second speed gear ratio is supplied by the motive force to the planetary gear set transmission from the motor generator unit to the first stage gear, with the SOWC disengaged and the second torque transmitting device engaged through the second element to the final drive, and
    wherein when a high to low gear shift is elected during a regeneration mode, the second torque transmitting device is initially disengaged followed by speeding up and matching a speed of the motor generator unit from a free wheel condition to a lock-lock condition.

2. The two-speed drive unit of the electric vehicle of claim 1, wherein the first element defines a ring gear member, the second element defines a carrier member and the third element defines a sun gear member.

3. The two-speed drive unit of the electric vehicle of claim 1, wherein the first element defines a carrier member, the second element defines a ring gear member and the third element defines a sun gear member.

4. The two-speed drive unit of the electric vehicle of claim 1, wherein the first element defines a sun gear member, the second element defines a carrier member and the third element defines a ring gear member.

5. The two-speed drive unit of the electric vehicle of claim 1, wherein the second torque transmitting device defines a friction clutch.

6. The two-speed drive unit of the electric vehicle of claim 1, wherein the SOWC is electrically actuated.

7. The two-speed drive unit of the electric vehicle of claim 6, further including a controller signaling operation of multiple locking and unlocking members of the SOWC.

8. The two-speed drive unit of the electric vehicle of claim 1, wherein the SOWC is grounded at the third element.

9. The two-speed drive unit of the electric vehicle of claim 1, wherein the SOWC provides for a reverse drive in a low gear (LL lock-lock) and a forward drive in a low gear using a free-wheel (FW) function.

10. The two-speed drive unit of the electric vehicle of claim 1, wherein the SOWC provides a first power drive defining a low to high gear free-wheel (FW) shift with the second torque transmitting device engaged.

11. The two-speed drive unit of the electric vehicle of claim 1, wherein the SOWC provides for a second power drive defining a high to low gear free-wheel (FW) shift with the second torque transmitting device disengaged.

12. The two-speed drive unit of the electric vehicle of claim 1, further including a controller, the controller including a processor and a non-transitory memory in communication with the processor, the non-transitory memory having stored instructions to be executed by the processor, the controller performing calculations and generating signals to the SOWC to transition into and out of an electrical vehicle (EV) mode defining a motor mode.

13. The two-speed drive unit of the electric vehicle of claim 12, wherein the signals generated by the controller are applied during an EV mode shift operation.

14. A method for operating a two-speed drive unit of an electric vehicle, comprising:
- attaching multiple elements to a planetary gear set transmission including a first element, a second element and a third element;
- supplying a motive force to the planetary gear set transmission from a motor generator unit;
- connecting a first torque transmitting device defining a selectable one-way clutch (SOWC) to the third element;
- connecting a second torque transmitting device to the planetary gear set transmission between the first element and the second element;
- providing a first drive speed range by supplying the motive force to the planetary gear set transmission from the motor generator unit to a first stage gear with the SOWC engaged and the second torque transmitting device disengaged through the second element to a final drive; and
- creating a second drive speed range by supplying the motive force to the planetary gear set transmission from the motor generator unit to the first stage gear, with the SOWC disengaged and the second torque transmitting device engaged through the second element to the final drive,
- wherein when a high to low gear shift is elected during a regeneration mode, the second torque transmitting device is initially disengaged followed by speeding up and matching a speed of the motor generator unit from a free wheel condition to a lock-lock condition.

* * * * *